United States Patent [19]

Quang et al.

[11] Patent Number: 4,620,940
[45] Date of Patent: Nov. 4, 1986

[54] PROCESS FOR MANUFACTURING SYNTHESIS GAS BY INDIRECT OXIDATION OF HYDROCARBONS

[75] Inventors: Dang Vu Quang, Paris; Claude Raimbault, Bailly; Régis Bonifay, Asnieres; Jean-Francois Le Page, Rueil-Malmaison, all of France

[73] Assignee: Institut Francais du Petrole, Rueil-Malmaison, France

[21] Appl. No.: 709,740

[22] Filed: Mar. 8, 1985

[30] Foreign Application Priority Data

Mar. 9, 1984 [FR] France ............................... 84 03791

[51] Int. Cl.$^4$ .............................................. C01B 3/36
[52] U.S. Cl. .................................. 252/373; 48/197 R
[58] Field of Search ........................................ 252/373

[56] References Cited

U.S. PATENT DOCUMENTS 4,376,758  3/1983  Pagani et al. ..................... 252/373

*Primary Examiner*—Natalie Trousof
*Assistant Examiner*—Bruce D. Gray
*Attorney, Agent, or Firm*—Millen & White

[57] ABSTRACT

A process for manufacturing synthesis gas (16) from hydrocarbons, water, free oxygen, and a transfer gas containing steam and carbon oxides. The transfer gas is passed through a succession of essentially adiabatic catalyst beds (2, 3, 4, 5, 6, 7) and the hydrocarbons (9, 10, 11) and oxygen (13, 14, 15) are alternately introduced at the input of each catalyst bed. The transfer gas may be prepared by vivid combustion of hydrocarbon or by hydrocarbon steam-reforming.

10 Claims, 5 Drawing Figures

PROCESS FOR MANUFACTURING SYNTHESIS GAS BY INDIRECT OXIDATION OF HYDROCARBONS

The invention concerns a process of manufacturing a synthesis gas containing hydrogen and carbon oxides. The resultant gas may be used mainly for the synthesis of primary alcohols.

BACKGROUND OF THE INVENTION

It is known to manufacture a synthesis gas formed of hydrogen and carbon oxides, by controlled oxidation of hydrocarbons mixtures such, for example, as natural gas, liquified petroleum gas or naphtha.

The operation is conducted at high temperature and in the presence of steam.

From a theoretical point of view, the controlled oxidation is of particular interest for the synthesis gases intended for the manufacture of methanol, since it makes possible, by adjustment of the oxygen amount, to obtain a gas having exactly the required stoichiometry for producing said alcohol.

As a matter of fact, for example, the following equations can be written for the first members of saturated hydrocarbons:

$$CH_4 + \tfrac{1}{2}O_2 \rightarrow CO + 2H_2 \quad (1)$$

$$C_2H_6 + \tfrac{1}{2}O_2 + H_2O \rightarrow 2CO + 4H_2 \quad (2)$$

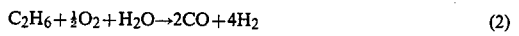

$$C_3H_8 + \tfrac{1}{2}O_2 + 2H_2O \rightarrow 3CO + 6H_2 \quad (3)$$

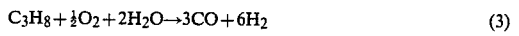

More generally, equation is:

$$C_nH_{2n+2} + \tfrac{1}{2}O_2 + (n-1)H_2O \rightarrow nCO + 2nH_2 \quad (4)$$

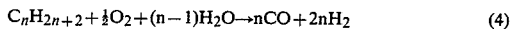

Methanol syntheses proceed according to the equation:

$$nCO + 2nH_2 \rightleftharpoons nCH_3OH \quad (5)$$

In fact, the reactions are slightly more complex since at the temperatures at which the synthesis gas is manufactured, water reacts as well with hydrocarbons as with CO according to the well known water gas formula:

$$CO + H_2O \rightleftharpoons CO_2 + H_2 \quad (6)$$

The $CO_2$ content of the synthesis gas is then used to produce methanol according to equation:

$$nCO_2 + 3nH_2 \rightleftharpoons nCH_3OH + nH_2O \quad (7)$$

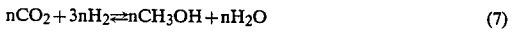

The safer and more common oxidation method is vivid flame combustion, either with air or with pure oxygen.

Pure oxygen is used for manufacturing synthesis gases, except for the manufacture of ammonia, where nitrogen is a necessary reactant.

The vivid combustion with pure oxygen, however suffers from a number of disadvantages.

On the one hand, numerous difficulties arise with respect to the resistance of the materials to the very high temperature of the flame, particularly when proceeding under high pressure.

On the other hand, when the oxygen amount is insufficient to stoichiometrically convert carbon to carbon dioxide and hydrogen to steam, the combustion is incomplete and the operation always results in a more or less substantial formation of soot (C. P. Marion & J. R. Muenger, AICHE Meeting, 5-9 April 1981).

For this reason, in the usual partial oxidation processes, the ratio of oxygen molecules to the carbon atoms to be burnt must not be lower than 0.7 (Hydrocarbon processing, September 1979, p. 191-194).

Now, when comparing equations (1) to (4), it is observed that the $O_2/C$ ratio ranges from 0.5 for equation (1) to $\tfrac{1}{2}n$ for equation (4), n being the number of carbon atoms of the molecule to be oxidized.

Another method for manufacturing synthesis gas is the catalytic oxidation of hydrocarbons.

This method is commonly used under atmospheric pressure in industrial processes such as ONIA-GEGI process, for example.

The increasing cost of the power required for compressing the manufactured gas makes these processes rather uneconomical.

In the sixties, tests have been performed in order to operate the catalytic oxidation under pressure, which is the only way of complying with the stoichiometry for methanol production.

When performed with pure oxygen, these tests were unsuccessful either because of the explosion phenomena, or because of clogging phenomena of the catalyst bed (Chem. Eng. Prog., Vol. 61, no 11, p. 85-88, November 1965).

When performed with mixtures of air and enriched air, these tests have led to the so-called primary and secondary reforming processes (D. R. Holland & S. W. Wan, Chem. Eng. Prog. Vol. 55 (8), p. 69-74, August 1963) used in ammonia synthesis.

In these processes, in order to avoid the clogging phenomena, a portion or the totality of the hydrocarbons charge is subjected to steam reforming before contacting the whole charge with oxygen diluted with nitrogen of air.

In order to maintain the oxygen concentration below a certain limit, particularly when the hydrocarbons are of the naphtha type or heavier, it has been proposed (U.S. Pat. No. 3,278,452) to introduce the nitrogen and oxygen mixture in 2 successive steps.

Recently, it has been proposed to apply the method of primary and secondary reformings to pure oxygen (French Pat. No. 2 372 116).

A comparison of the oxygen content of the mixture with the limits of explosiveness of gases in pure oxygen, makes obvious the potential difficulties arising for such an application.

SUMMARY OF THE INVENTION

By the process of the present invention, the difficulties inherent in the catalytic oxidation process with pure oxygen and under pressure, are avoided.

The process, according to the invention, for the manufacture of synthesis gas, is defined as: A process for manufacturing a synthesis gas containing hydrogen and carbon oxides, from a hydrocarbons charge, water, free oxygen and a transfer gas containing at least 25% by volume of steam and at least 2% by volume of at least one carbon oxide selected from the group consisting of carbon monoxide and carbon dioxide, characterized by the simultaneous steps of:

passing the transfer gas through a succession of at least two, preferably at least 4 essentially adiabatic catalyst beds, and introducing at each of the successive inputs of catalyst beds, in alternation, either a fraction of hydrocarbons or oxygen, provided that the transfer gas which must receive oxygen does not contain more than 25% by volume of methane and 5% by volume of higher hydrocarbons at the point of oxygen introduction, that the oxygen amount introduced at each catalyst bed input is lower than the amount forming an explosive mixture with the transfer gas, and that the transfer gas which must receive the hydrocarbons does not contain more than 1,000 parts per million by volume of free oxygen at the point of introduction of the hydrocarbons.

The operating conditions of the process are generally:

a pressure ranging from 1 to 50 MPa, preferably from 3 to 30 MPa, a temperature ranging from 500° to 3000° C., preferably 700°-2000° C.

Thus, according to a preferred embodiment of the invention, a hydrocarbons mixture, divided into several fractions, is catalytically cracked and oxidized by a so-called "transfer gas" which is itself subsequently reoxidized by pure oxygen, divided in several fractions. The points of introduction of hydrocarbons and oxygen in the catalyst bed are distinct and alternate and selected at a sufficient distance from one another along the path of the gases, so that the resultant gas mixture never has a high concentration of both combustible substance and oxygen, i.e. a concentration liable to result in an explosion or a sharp decomposition. In every point, the oxygen concentration must comply with the value L as defined hereinafter.

According to a preferred embodiment of the process of the invention, the transfer gas, consisting usually of steam, carbon oxides, hydrogen and small amounts of hydrocarbons, particularly methane, after being heated to high temperature, is circulated through the catalyst zone, divided into several compartments and receives at the input of each compartment, alternately and successively, a portion of the hydrocarbons mixture, optionally with steam, and a portion of oxygen, optionally with steam, the hydrocarbons charge and oxygen being devided into several aliquot parts.

Accordingly, oxygen is never directly in contact with the fresh hydrocarbons mixture whose reaction with oxygen is liable to be too violent and to develop either into an explosion or into a sharp decomposition.

One of the characteristics of the present process is that the transfer gas destined to be contacted directly with oxygen is a mixture of steam and carbon oxides, of law or decreased content in hydrocarbon elements; this gas contain no more than 25% by volume of methane and no more than 5% by volume of higher hydrocarbons. Preferably, the total hydrocarbons amount of the gas is not higher than 15% by volume.

The transfer gas may be obtained in any known manner and for example from a hydrocarbons mixture destined to the manufacture of synthesis gas, either by vivid combustion with oxygen or by steam-reforming, or by both methods used simultaneously or successively.

The vivid combustion with oxygen is characterized in that the oxygen amount must be at least 0.4 times the necessary amount to convert the carbon of the mixture to carbon dioxide and the hydrogen of the mixture to steam.

In other terms, when $C_aH_{4b}$ designates the average molecule of the hydrocarbons mixture and c the oxygen amount, the equation is as follows:

$$C_aH_{4b} + (a+b)O_2 \rightarrow aCO_2 + 2bH_2O \quad (8)$$

$$c \geq 0.4(a+b) \quad (9)$$

For limiting the temperature of the flame, steam is injected in a ratio of water molecules/carbon atoms higher than 0.5, preferably higher than 1.

The production of transfer gas may also be achieved in a known manner by steam reforming of hydrocarbons, preferably at a pressure close to that of the manufacture of the synthesis gas and at a temperature in the range of 500°-1000° C., preferably 600°-900° C.

Another characteristic of the process of the invention consists in the use of pure oxygen (of at least 90% purity, preferably at least 95%, i.e. containing at most 10%, preferably at most 5% of nitrogen).

Its content, in % by volume, in the mixture obtained with the transfer gas must never exceed the value L obtained by derivation of the "Le Chatelier" law, according to formula (10):

$$L = \frac{100}{\frac{PH_2}{NH_2} + \frac{PCO}{NCO} + \frac{PCH_4}{NCH_4}} \quad (10)$$

wherein $PH_2$, $PCO$ and $PCH_4$, are the respective proportions of hydrogen, carbon monoxide and methane of the transfer mixture which are so defined that:

$$PH_2 + PCO + PCH_4 = 100 \quad (1)$$

P being expressed in % by volume; $NH_2$, NCO and $NCH_4$ being the lower explosiveness concentration limits respectively of hydrogen, carbone monoxide and methane in pure oxygen, as published for example in the book "Les mélanges explosifs", edited by Institut National de Sécurité no 335, p. 128, September 1964.

|  | Lower explosiveness limits: |
|---|---|
| Hydrogen | 4.65 per cent b.v. |
| Carbon monoxide | 15.50 per cent b.v. |
| Methane | 5.15 per cent b.v. |

Other characteristics are given in the following description.

BRIEF DESCRIPTION OF THE DRAWINGS

The invention will be further described more in detail with reference to the accompanying drawings wherein.

Figure 1:
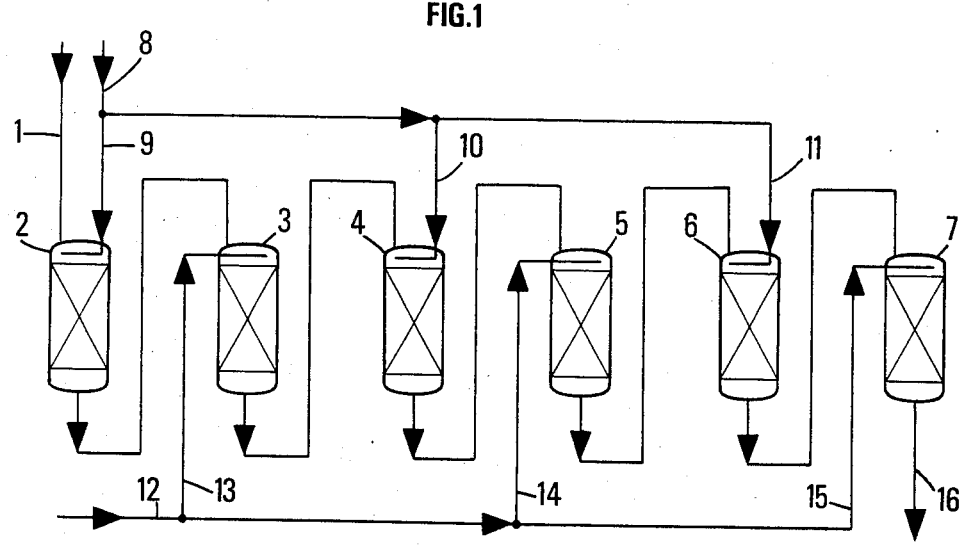
FIGS. 1 and 2 are flow-sheets illustrating the process using a catalyst bed distributed in separate reactors.

In the unit for manufacturing the synthesis gas shown in FIG. 1, the transfer gas is supplied through line 1. It is pressurized and pre-heated.

From line 1, it successively passes through enclosures 2, 3, 4, 5, 6 and 7, each containing a bed of steam-reforming catalyst, for example a nickel catalyst deposited on a refractory carrier such as alumina. Other catalysts are described for example in U.S. Pat. No. 3,278,452.

The hydrocarbons mixture destined to the manufacture of the synthesis gas, whose pressure and temperature have been preliminarily adjusted and which contains steam for avoiding eventual deposits of carbon and soot, is introduced through line 8 and distributed through lines 9, 10 and 11 into enclosures 2, 4 and 6.

In these enclosures, a molecular re-arrangement resulting from the high temperature and from the catalyst action, converts the hydrocarbons to hydrogen, carbon oxides and methane. The oxygen of carbon dioxide and of water essentially reacts with the carbon of hydrocarbons to form carbon monoxide and release hydrogen.

The conversion is endothermic and the gases are discharged at much lower temperatures than those prevailing at the input of the catalyst beds.

At the output of these beds, they are admixed with oxygen, fed through line 12 and distributed through lines 13, 14 and 15.

Oxygen destructs the residual methane contained in the transfer gas, overoxidizes carbon monoxide and reacts with hydrogen to form water.

The operation is catalyzed by catalyst beds contained in enclosures 3, 5 and 7. This operation has the effect of heating the gases which finally are discharged through line 16 where practically all the hydrocarbons introduced through line 8 and all the oxygen introduced through line 12 have disappeared.

Finally, the result of the operation is the same as if the hydrocarbons of line 8 had been oxidized by the oxygen of line 12, but it is apparent that, by the process of the invention, the oxygen is always at a low concentration and is never in substantial direct contact with fresh hydrocarbons whose strong reactivity always tends to deviate the reactions either towards the explosion or towards a sharp decomposition, for example to carbon black or to soot.

This arrangement of FIG. 1 is based on the assumption that the transfer gas did not practically contain hydrocarbons and the operation started with a steam-reforming of a portion of hydrocarbons to be converted.

Figure 2:
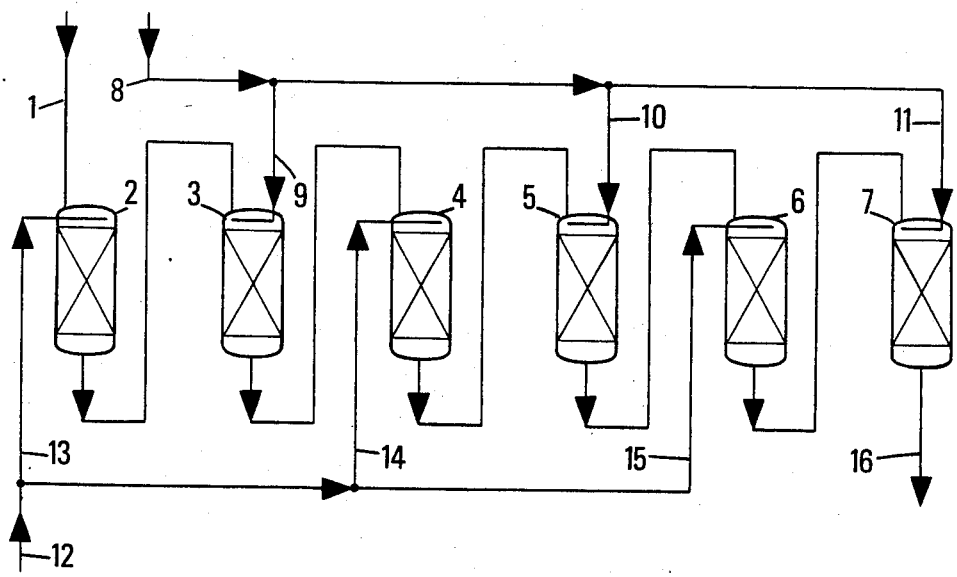

It is obvious that the order of introduction may be reversed and FIG. 2 shows an arrangement where the transfer gas contains a sufficient amount of methane (or other hydrocarbons) to absorb a portion of the oxygen; the latter has thus been injected first through the catalyst bed of enclosure 2. Lines 9, 10 and 11 then respectively feed enclosures 3, 5, and 7 and lines 13, 14 and 15, enclosures 2, 4 and 6.

FIGS. 1 and 2 show six catalyst enclosures each containing a catalyst bed. The number of beds may vary from 2 to 30, preferably from 4 to 20, without departing from the scope of the invention.

In these figures, the catalyst beds, at least 2, preferably at least 4, are contained in distinct and separate enclosures.

Figure 3:
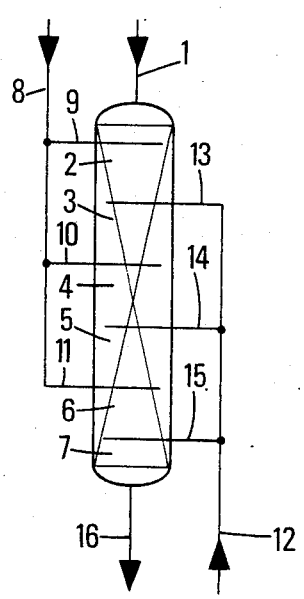
FIGS. 3, 4, and 5b show a longitudinal cross-section of reactors containing the totality of the catalyst.
Figure 4:
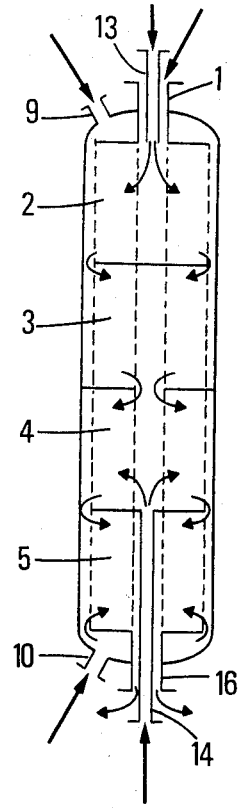

It will be easily understood that for performing the process of the invention, these beds may be contained in a single enclosure and arranged as in FIGS. 3 or 4, for example, where the same numeral references correspond to the same items as in FIGS. 1 and 2.

Figure 5A:
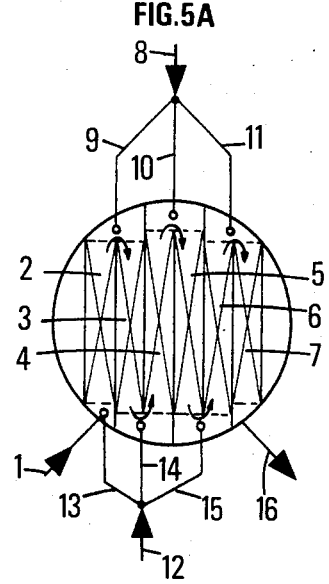
FIG. 5a is a transversal cross-section of the reactor of FIG. 5b.
Figure 5B:
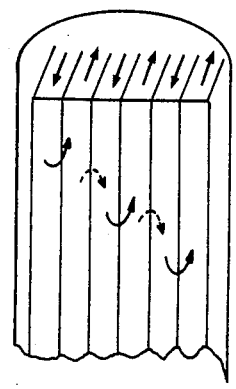

According to a preferred embodiment of the process of the invention, a longitudinal reactor as shown in FIGS. 5a and 5b (French Patent application No. 2 527 097) is used.

EXAMPLE 1
(FIG. 1)

A synthesis gas is manufactured from 7.2 moles of $CH_4$ (line 8) and 2 moles of oxygen (line 12) and the transfer gas is composed of 1 mole of carbon dioxide and 22 moles of steam (line 1).

The pressure of the gases is 5 MPa.

The transfer gas is heated to 1500° C.

The transfer gas is first admixed with 3.2 of the 7.2 methane moles and with 1.5 water moles preliminarily heated to 750° C. (line 9).

The mixture passes through the catalyst bed placed in enclosure 2 and containing a catalyst of nickel on alumina.

The effluent consists of 33.6 moles of gas at a temeprature of about 870° C. and whose composition by volume is approximately as follows:

| | |
|---|---|
| CO | 4.7 |
| $CO_2$ | 7.1 |
| $H_2$ | 30.7 |
| $CH_4$ | 0.7 |
| $H_2O$ | 56.8 |
| | 100.0 |

The gases pass from enclosure 2 to enclosure 3 and receive the 0.7 of the 2 oxygen moles diluted in 0.35 steam mole (line 13).

At the output of enclosure 3, the temperature of the gases, as a result of the oxidation effect, is increased to 1070° C. and their composition by volume in % is now:

CO: 5.9
$CO_2$: 6.3
$H_2$: 27.2
$CH_4$: 100 parts per million
$H_2O$: 60.6

The operation is continued with the remaining gases, consisting of:

2 moles of $CH_4$ and 1 mole of water in line 10
2 moles of $CH_4$ and 1 mole of water in line 11
0.7 mole of oxygen and 0.35 mole of water in line 14
0.6 mole of oxygen and 0.3 mole of water in line 15

During these injections and after each methane introduction and cracking over the catalyst bed, the temperature is decreased to about 870° C. The oxygen injection and reaction result on the contrary in an increase of the temperature to 1070° C. after the first injection, 990° C. after the second, and 930° C. after the third injection.

The methane content which increases to 5-6% during each introduction of this gas, then decreases by reforming to about 1.8% at the output of enclosure 4 and about 2.7% at the output of enclosure 6.

After each oxidation, the methane content still decreases down to 0.2% at the output of enclosure 5 and to about 1% at the output of enclosure 7. It must be observed that the residual oxygen content is practically indeterminable at the locations of methane introduction.

Finally, the gases are discharged through line 16, at a temperature of 930° C.

After water condensation, 26.7 moles of gas are obtained whose composition is substantially as follows (in percent by volume):

| | |
|---|---|
| CO | 16.0 |
| $CO_2$ | 12.8 |
| $H_2$ | 69.3 |
| $CH_4$ | 1.9 |
| | 100.0 |

It will be observed that the ratio $H_2/(2CO+3CO_2)$ is 0.984, hence very close to the stoichiometry for methanol synthesis.

EXAMPLE 2

Here, substantially the same synthesis gas is manufactured from 8.2 moles of $CH_4$ and 4 moles of oxygen.

1 mole of $CH_4$ and 2 moles of oxygen withdrawn therefrom are separately fed to a burner, so as to form the transfer gas.

In order to limit the temperature to 1500° C., 20 moles of water are simultaneously introduced in the combustion chamber and the transfer gas obtained at the output is substantially identical to that available when starting the operation of example 1.

The remaining gases (7.2 moles of $CH_4$ and 2 moles of oxygen) are treated in the same manner as described in example 1.

EXAMPLE 3

(FIG. 2)

The synthesis gas is manufactured from 1500k moles/h of natural gas (line 8), 1320k moles/h of oxygen (line 12) and 11200k moles per hour of a transfer gas having substantially the following composition in percent by volume:

| | |
|---|---|
| CO | 5.0 |
| $CO_2$ | 6.4 |
| $H_2$ | 36.6 |
| $CH_4$ | 8.5 |
| $H_2O$ | 43.5 |
| | 100.0 |

The gas is introduced through line 1 under 5 MPa at 800° C. It is fed (FIG. 2) to enclosure 2 and also receives 440 from the 1320k moles/h of oxygen from line 13.

Enclosure 2 contains a catalyst of the same nature as in examples 1 and 2.

The remaining amount of oxygen fed through line 12 is distributed by halves into lines 14 and 15.

At the output of enclosure 2 the gas is at a temperature of 920° C. and has the following composition by volume:

| | |
|---|---|
| CO | 9.3 |
| $CO_2$ | 6.3 |
| $H_2$ | 42.5 |
| $CH_4$ | 2.1 |
| $H_2O$ | 39.8 |
| | 100.0 |

The so-heated and oxidized gas will be used to rearrange 500 of the 1500k moles/h of the natural gas. These 500k moles/h are fed through the branched line 9 to enclosure 3.

The additional natural gas has approximately the following composition by volume:

| | |
|---|---|
| $CO_2$ | 1.80 |
| $CH_4$ | 82.65 |
| $C_2H_6$ | 13.95 |
| $C_3H_8$ | 1.60 |
| | 100.00 |

The remainder of additional natural gas (1000k moles/h) is distributed by halves into lines 10 and 11.

At the output of enclosure 3, as a result of the effect of the catalyst bed and of the heat and combined oxygen supplied by the transfer gas issuing from enclosure 2, the hydrocarbons molecules supplied through line 9 are converted to $H_2$ and carbon oxides, thus producing 13 200k moles/h of a gas whose composition by volume is approximately as follows:

| | |
|---|---|
| CO | 8.8 |
| $CO_2$ | 6.6 |
| $H_2$ | 41.8 |
| $CH_4$ | 5.9 |
| $H_2O$ | 36.9 |
| | 100.0 |

The temperature of the gases was decreased to 870° C.

The same operation is continued through catalyst beds of enclosures 4, 5, 6 and 7 successively with 440k moles/h of oxygen (line 14). 500k moles/h of hydrocarbons mixture (line 10), 440k moles/h of oxygen (line 15) and finally the last 500k moles/h of hydrocarbons mixture (line 11).

The temperatures increased to 920° C. after the first oxygen injection, to 990° C. after the second and to 1060° C. after the last one.

The temperatures fall to 870° C. after the first injection of natural gas, to 920° C. after the second and to 960° C. after the third and last one.

With respect to the composition, the injection of natural gas does not substantially change the CO and $CO_2$ contents, but the oxygen injection results in an increase of the CO content from 5 to 9% after the first injection, from 9 to 12% after the second and from 12 to 15% after the last one. The $CO_2$ content on the contrary still remains at about 5–6%.

The methane content is divided by a factor of 4 to 6 after each oxygen introduction. It decreases by 1 to 2 points after each passage through the reforming beds.

Finally, the gases are discharged through line 16 at a temperature of about 960° C.

After condensation and water removal, 12,000k moles/h of synthesis gas are obtained, whose composition by volume is as follows:

| | |
|---|---|
| CO | 20.8 |
| $CO_2$ | 8.3 |
| $H_2$ | 67.0 |
| $CH_4$ | 3.9 |
| | 100.0 |

These figures correspond to a ratio $H_2/(2CO+3CO_2)$ of 1.008, thus substantially the theoretical value for methanol synthesis.

EXAMPLE 4

Here, 3,400k moles/h of the same natural gas as in example 2 and 1,320k moles/h of oxygen are used.

1,900k moles/h of natural gas withdrawn therefrom are supplied to tubes filled with catalyst of a reforming furnace in the presence of 6,800k moles/h of steam. The operating pressure is 5 MPa and the temperature 800° C.

At the output, 11,200k moles/h of gas are obtained whose composition is that of the transfer gas used in example 3.

The remaining 1,320k moles/h of oxygen and 1,500k moles/h of natural gas are treated in the same manner as in example 3.

What is claimed as the invention is:

1. A process for manufacturing a synthesis gas containing hydrogen and carbon oxides, from a hydrocarbons charge, water, free oxygen and a transfer gas containing at least 25% by volume of steam and at least 2% by volume of at least one of carbon monoxide or carbon dioxide, comprising the steps of:

passing the transfer gas through a succession of at least two essentially adiabatic catalyst beds, and introducing alternately at each of the successive inputs of each catalyst bed either a fraction of the hydrocarbon charge or a fraction of oxygen flow, provided that the transfer gas which receives oxygen does not contain more than 25% by volume of methane and 5% by volume of higher hydrocarbons at the point of oxygen introduction, that the oxygen amount introduced at each catalyst bed input is lower than the amount of oxygen that would form an explosive mixture with the transfer gas, such that each oxygen fraction corresponds to an oxygen portion by volume in the mixture with the transfer gas lower than the value L, wherein:

$$L = \frac{100}{\frac{PH_2}{NH_2} + \frac{PCO}{NCO} + \frac{PCH_4}{NCH_4}}$$

wherein $PH_2$, $PCO$ and $PCH_4$ are respectively the hydrogen, carbon monoxide and methane proportions, so that $PH_2 + PCO + PCH_4 = 100$ and $NH_2$, $NCO$ and $NCH_4$ are the explosiveness concentration limits of hydrogen, carbon monoxide and methane in pure oxygen, and are 4.65, 15.50 and 5.15% by volume of pure oxygen respectively, with the further proviso that the transfer gas which must receive the hydrocarbons does not contain more than 1,000 parts per million by volume of free oxygen at the point of hydrocarbons introduction.

2. A process according to claim 1 characterized in that the operations are conducted under a pressure of 1-50 MPa at a temperature of 500°-3000° C.

3. A process according to claim 1, characterized in that the hydrocarbons charge has the average molecular formula $C_aH_{4b}$ and the transfer gas is obtained by combustion in the presence of steam, of a hydrocarbon charge, the combustion being performed with oxygen of a purity higher than 90% by volume and under such conditions that the oxygen molar amount be at least equal to 0.4 time the sum (a+b) and the molecular ratio of $H_2O$ to carbon atoms be higher than 1.

4. A process according to claim 1, characterized in that the transfer gas is obtained by steam-reforming of a fraction of the hydrocarbon charge, the reforming being conducted practically at the same pressure as that of the synthesis gas manufacture and at a temperature from 500° to 1000° C.

5. A process according to claim 1, characterized in that the number of catalyst beds is at least 4.

6. A process according to claim 1, characterized in that oxygen is introduced at the input of the beds of odd order and the hydrocarbon at the input of the beds of even order.

7. A process according to claim 1, characterized in that the hydrocarbon is introduced at the input of the beds of odd order and the oxygen at the input of the beds of even order.

8. A process according to claim 1, characterized in that the operations are conducted under a pressure from 3 to 30 MPa and at a temperature from 700° to 2000° C.

9. A process according to claim 1, wherein the free oxygen contains at least 90% b.v. of $O_2$.

10. A process according to claim 1, wherein the free oxygen contains at least 95% b.v. of $O_2$.

* * * * *